United States Patent
Black et al.

(10) Patent No.: US 12,430,316 B2
(45) Date of Patent: Sep. 30, 2025

(54) ARTIFICIAL INTELLIGENCE-BASED AUTOMATED PARSER CREATION

(71) Applicant: Google LLC, Mountain View, CA (US)

(72) Inventors: James Paul Black, Sunnyvale, CA (US); Ashish Garg, Bangalore (IN); Adam Licata, South Orange, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/402,291

(22) Filed: Jan. 2, 2024

(65) Prior Publication Data

US 2025/0217346 A1 Jul. 3, 2025

(51) Int. Cl.
*G06F 16/23* (2019.01)
*G06F 40/205* (2020.01)

(52) U.S. Cl.
CPC ........ *G06F 16/2358* (2019.01); *G06F 40/205* (2020.01)

(58) Field of Classification Search
None
See application file for complete search history.

(56) References Cited

U.S. PATENT DOCUMENTS

| | | | | |
|---|---|---|---|---|
| 11,366,734 B2* | 6/2022 | Xia | ...................... | G06F 11/0787 |
| 11,475,353 B2* | 10/2022 | Rangasamy | ............. | G06N 7/01 |
| 11,537,498 B2* | 12/2022 | Ibrahim | .................. | G06F 21/57 |
| 11,625,366 B1* | 4/2023 | Steiman | ................. | G06N 5/022 |
| | | | | 707/601 |
| 11,755,588 B2* | 9/2023 | Seshadri | ........... | G06F 16/24568 |
| | | | | 707/756 |
| 12,008,004 B1* | 6/2024 | Fournier | ........... | G06F 16/24575 |
| 12,107,874 B2* | 10/2024 | Malhotra | ............. | H04L 63/1425 |
| 2020/0019484 A1 | 1/2020 | Kolesnik et al. | | |
| 2020/0112590 A1 | 4/2020 | Bhatia et al. | | |
| 2023/0222358 A1 | 7/2023 | Wu et al. | | |
| 2024/0161648 A1* | 5/2024 | Davies | ..................... | G09B 7/00 |

OTHER PUBLICATIONS

International Search Report and Written Opinion for International Application No. PCT/US2025/010113, mailed Mar. 25, 2025, 14 Pages.
Nam S., et al., "Log Analysis and Prediction for Anomaly Detection in Network Switches", The International Conference on Network and Service Management (CNSM), IEEE, Oct. 2023, 7 Pages.

* cited by examiner

*Primary Examiner* — Debbie M Le
(74) *Attorney, Agent, or Firm* — Lowenstein Sandler LLP

(57) ABSTRACT

A method for artificial intelligence-based automated parser creation includes obtaining a first event log of one or more first event logs of first telemetry data. The first event log includes one or more event log key-value pairs. The method includes generating, using a first artificial intelligence (AI) model, a portion of parser code to map a first event log key of an event log key-value pair of the one or more event log key-value pairs to a predefined field. The method includes generating an event log parser that includes the portion of the parser code. The method includes causing the event log parser to be executed on a second event log of one or more second event logs of second telemetry log data.

20 Claims, 12 Drawing Sheets

300

310
Obtain a first event log comprising one or more event log key-value pairs

320
Generate, using a first AI model, a portion of parser code to map a first event log key to a predefined field

330
Generate an event log parser that includes the portion of the parser code

340
Cause the event log parser to be executed on a second event log

```
{
  402-1 → "timestamp": 1588059648.129,
  402-2 → "duration": 23,
          "ip": {
  402-3 →   "client_address": "192.168.23.4",
  402-4 →   "target_address": "203.0.113.52"
          },
          "http":{
  402-5 →   "result_code": "TCP_HIT/200",
  402-6 →   "response_length": 904,
  402-7 →   "request_method": "GET"
          },
  402-8 → "url": "www.sample.com/images/logo.png",
  402-9 → "content_type": "image/JPEG"
}
```

FIG. 4A

| Event Log Field | Predefined Field |
|---|---|
| timestamp | metadata.event_timestamp |
| duration | |
| ip.client_address | principal.ip |
| ip.target_address | target.ip |
| http.result_code | network.http.response_code |
| http.response_length | network.http.received_bytes |
| http.request_method | network.http.method |
| url | target.url |
| content_type | |

```
{
    "metadata": {
602-1 →   "event_timestamp": "2020-04-28T07:40:48.129Z",
602-8 →   "event_type": "NETWORK_HTTP",
602-9 →   "product_name": "Acme Web Proxy",
602-10→   "vendor_name": "Acme"
    },
    "principal": {
602-2 →   "ip": "192.168.23.4"
    },
    "target": {
602-7 →   "url": "www.sample.com/images/logo.png",
602-3 →   "ip": "203.0.113.52"
    },
    "network": {
        "http": {
602-6 →       "method": "GET",
602-4 →       "response_code": 200,
602-5 →       "received_bytes": 904
        }
    },
}
```

710
Obtain a first event log comprising one or more event log key-value pairs

720
Identify, from among multiple predefined fields and using a clustering-based AI model, a predefined field for an event log key

730
Generate a portion of parser code to map the event log key to the identified predefined field

740
Generate an event log parser that includes the portion of the parser code

750
Cause the event log parser to be executed on a second event log

810
Obtain a first event log comprising one or more event log key-value pairs

820
Identify, from among multiple predefined fields and by using an AI model, a first predefined field for an event log key

830
Generate a portion of parser code to map the event log key to the identified predefined field

840
Generate an event log parser that includes the portion of the parser code

850
Cause the event log parser to be executed on a second event log

FIG. 8

ARTIFICIAL INTELLIGENCE-BASED AUTOMATED PARSER CREATION

TECHNICAL FIELD

The instant specification generally relates to computing devices. More specifically, the instant specification relates to artificial intelligence-based automated parser creation.

BACKGROUND

Computing devices-including servers, storage devices, or network devices- and software applications generate event logs in response to certain actions that occur on the computing devices or in the applications. The actions can include an operating system event, an error generated by a software application, or other actions that can occur on a computing device or in an application. An event log often takes the form of a key-value pair where the key can include text that indicates what the corresponding value means. Data analytics platforms can analyze these event logs to determine a variety of phenomena that can occur on the computing devices or in the software applications, including identifying trends regarding use of the computing devices or identifying malicious activity such as a cyberattack.

SUMMARY

Disclosed herein are systems and methods for automatically creating parsers for event log data using artificial intelligence (AI). One aspect of the disclosure includes a method. The method includes obtaining a first event log of one or more first event logs of first telemetry data. The first event log includes one or more event log key-value pairs. The method includes generating, using a first artificial intelligence (AI) model, a portion of parser code to map a first event log key of a first event log key-value pair of the one or more event log key-value pairs to a predefined field. The method includes generating an event log parser that includes the portion of the parser code. The method includes causing the event log parser to be executed on a second event log of one or more second event logs of second telemetry log data.

Another aspect of the disclosure includes a system. The system includes a memory and at least one processing device coupled to the memory and configured to perform operations. The operations include obtaining a first event log of one or more first event logs of first telemetry data. The first event log includes one or more event log key-value pairs. The operations include identifying, from among one or more predefined fields and by using a clustering-based AI model, a predefined field for an event log key of a first event log key-value pair of the one or more event log key-value pairs. The operations include generating a portion of parser code to map the event log key to the identified predefined field. The operations include generating an event log parser that includes the portion of the parser code. The operations include causing the event log parser to be executed on a second event log of one or more second event logs of second telemetry log data.

Another aspect of the disclosure includes a non-transitory computer readable storage medium including instructions for a computing device that, when executed by a processing device, cause the processing device to perform operations. The operations include obtaining a first event log of one or more first event logs of first telemetry data. The first event log includes one or more event log key-value pairs. The operations include identifying, from among one or more predefined fields and by using an AI model, a first predefined field for an event log key of an event log key-value pair of the one or more event log key values pairs. The operations include generating a portion of parser code to map the event log key to the identified first predefined field. The operations include generating an event log parser that includes the portion of the parser code. The operations include causing the event log parser to be executed on a second event log of one or more second event logs of second telemetry log data.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3 depicts a flowchart illustrating an example method for practicing selected aspects of the present disclosure, in accordance with various embodiments.

FIG. 4A schematically illustrates an example event log in which selected aspects of the present disclosure may be implemented, in accordance with various embodiments.

FIG. 4B schematically illustrates an example set of mappings in which selected aspects of the present disclosure may be implemented, in accordance with various embodiments.

FIG. 6 schematically illustrates an example data object in which selected aspects of the present disclosure may be implemented, in accordance with various embodiments.

FIG. 7 depicts a flowchart illustrating an example method for practicing selected aspects of the present disclosure, in accordance with various embodiments.

FIG. 8 depicts a flowchart illustrating an example method for practicing selected aspects of the present disclosure, in accordance with various embodiments.

DETAILED DESCRIPTION

Figure 1:
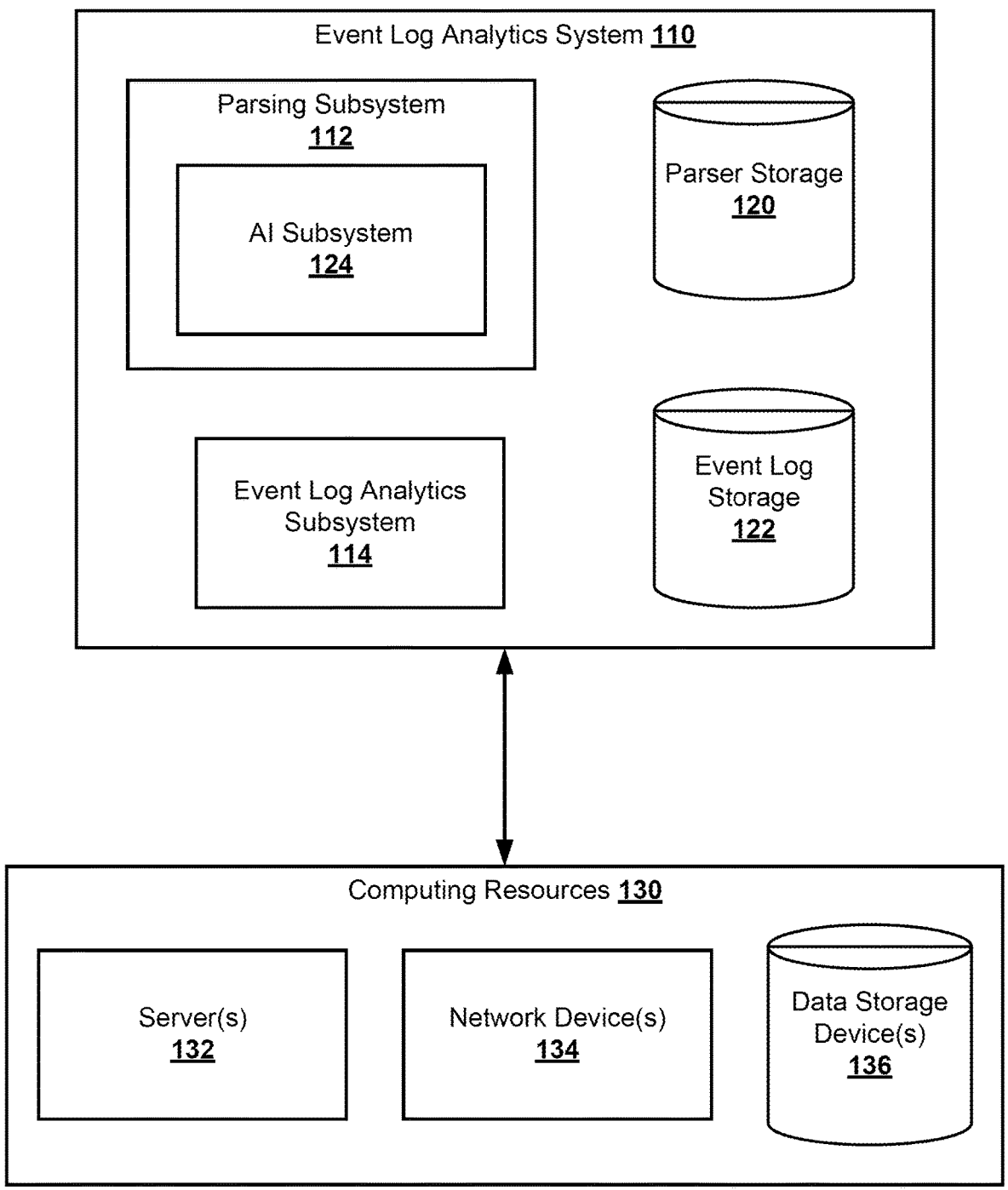
FIG. 1 schematically illustrates an example system for AI-based automated parser creation in which selected aspects of the present disclosure may be implemented, in accordance with various embodiments.

Computing networks—which can include computing devices, network devices, other types of devices, and software applications—generate event logs in response to certain actions that occur in the network. The actions can include an operating system event, an error generated by a software application, or other actions that can occur in the network. Data analytics platforms can analyze these event logs to determine a variety of phenomena that can occur in the computing network, such as identifying trends regarding use of the computing devices in the network or identifying malicious activity such as a cyberattack on the network.

Event logs can come in many formats and take a variety of forms, depending on the vendor of the device that generated the event log, the model of the device, the vendor of the software application, the version of the application, or the type of event represented by the event log. In some cases, two different devices or applications that perform similar functionality can generate event logs in very different formats for the same or similar events. In order for a data analytics platform to intelligently analyze event logs, the data analytics platform may convert event logs into a predefined schema.

The data analytics platform may use event log parsers (sometimes referred to, herein, simply as "parsers") to convert event logs to the predefined schema. A parser may include a piece of software configured to accept an event log as input and convert the event log into a data object that complies with the predefined schema. The data analytics platform may also use event log parser extensions (sometimes referred to, herein, simply as "parser extensions") to augment a parser's functionality and capabilities. A parser extension may include a piece of software configured to accept an event log as input, extract certain data from the event log (which may include data a parser that executed on the same event log did not convert into the predefined schema), and insert it into the data object.

However, with the large number of devices and software applications available, it is sometimes difficult for the operator of the data analytics platform to manually create new event log parsers and parser extensions for new and modified event logs from new and modified devices and software applications. Also, because a parser may be software code-based, users of the data analytics platform may not have the technical knowledge or experience to create or modify a parser. Thus, a data analytics platform's parsers may not be able to handle the desired event logs, which can lead to the data analytics platform being unable to provide data analysis insights to some event logs, which may lead to computational inefficiencies by the devices generating the event logs. In some cases, the data analytics platform may be unable to recognize malicious activity such as security breaches or cyberattacks on devices that generate some event logs, exposing these devices to downtime or malware.

Aspects and implementations of the present disclosure address the above deficiencies, among others, by providing an event log analytics system capable of generating event log parsers using artificial intelligence (AI) techniques. The event log analytics system can ingest a sample event log, use an AI model to generate parser code that maps event log keys in the sample event log to corresponding predefined fields, generate an event log parser that includes the parser code, and cause the event log parser to be executed. The parser, when executed on an event log, may then use the parser code to extract values from the event log and assign the values to predefined fields according to the mapping configured by the parser code to convert the event log into the predefined format. The event log analytics system can then analyze the converted event log information to identify trends in the event logs, identify malicious activity such as security breaches or cyberattacks, and provide other network enhancements. In some implementations, the AI model may identify the predefined field that an event log key should map to and generate parser code based on that identification. In certain implementations, the event log key to predefined field mappings that are implemented by the parser code may be presented to a user of the platform. The user can then confirm the AI model's mapping or can input a different mapping. The AI model can then update based on the user's input.

Some benefits of the present disclosure may include providing a system that can automatically create event log parsers without input from a person. Instead, the AI model can identify the event log key-to-predefined field mappings, generate the parser code to implement these mappings, and generate an event log parser that includes the parser code. As a consequence, the system reduces the time spent by a person writing the parser code, which reduces the time between the introduction of a new type of event log and generating an event log parser for that event log type. Additionally, a parser generated using an AI model includes fewer human errors.

In addition, some benefits of the present disclosure may provide a technical effect caused by or resulting from a technical solution to a technical problem. For example, one technical problem may relate to the inability of a data analytics platform to analyze event logs from certain devices because the devices are new or have been modified and, thus, existing parsers cannot recognize certain data in the event logs and, thus, do not capture such data. One of the technical solutions to the technical problem may include using an AI model to generate a parser and then use the parser to capture the previously uncaptured event log data. As a consequence, the inability of a data analytics platform to capture important data in the event logs is reduced or eliminated.

Another technical problem may relate to the improper configuration of certain devices in a computing network. The improper configuration may result in inefficient usage of computing resources (including processing device usage, memory usage, storage usage, or network traffic). One of the technical solutions to the technical problem may include using parsers of the event log analytics system to convert event logs from the devices in the computing network into a predefined format. The event log analytics system can then analyze the converted event log data in the predefined format to identify alternative configurations that are more efficient. As a consequence, computing resources used by the computing network are reduced and computing resource usage is more efficient.

Another technical problem may relate to the improper configuration of the computing network resulting in the network being exposed to cyberattacks. One of the technical solutions to the technical problem may include using parsers of the event log analytics system to convert event logs from the devices in the computing network into a predefined format. The event log analytics system can then analyze the standardized event log data to identify cyberattack attempts. As a consequence, the operator of the computer network can take actions to prevent the cyberattacks or reduce their impact on the network, and effects of cyberattacks on the network are reduced or eliminated.

FIG. 1 is a schematic block diagram illustrating an example system 100 for AI-based automated parser creation in which selected aspects of the present disclosure may be implemented, in accordance with various embodiments. The system 100 may include an event log analytics system 110.

The event log analytics system 110 may include a parsing subsystem 112, an event log analytics subsystem 114, a parser storage 120, or a predefined event log storage 122. The parsing subsystem 112 may include an AI subsystem 124. The system 100 may include computing resources 130. The computing resources 130 may include one or more servers 132, one or more network devices 134, or one or more data storage devices 136. The event log analytics system 110 and the computing resources 130 may be in data communication with each other over a data network.

In some implementations, the event log analytics system 110 may include a computing network that includes one or more computing devices. The event log analytics system 110 may be configured to receive event log data from the computing resources 130, use parsers and parser extensions to convert the event log data into a predefined format and perform data analytics operations on the event log data in the predefined format.

In some implementations, a computing device may include a physical computing device or may include a virtualized component, such as a virtual machine (VM) or a container. A computing device may include an instance of a computing device. An instance of a computing device may include a spun-up instance that may not be specific to any computing device. In some implementations, a VM may include a system virtual machine, which may include a VM that emulates an entire physical computing device. A VM can include a process virtual machine, which may include a VM that emulates an application or some other software. A container may include a computing environment that logically surrounds one or more software applications independently of other applications executing in the cloud computing environment.

In some cases, the event log analytics system 110 may include a cloud computing system. A cloud computing system may include one or more computing devices (or portions of cloud computing devices) provided to an end user by a cloud provider. An end user of the environment may utilize a portion of the cloud computing system to host content for use or access by other parties or perform other computational tasks. In some implementations, the cloud computing system may be configured to allow the end user to use a portion of a computing device (e.g., only certain hardware, software, or other computer system resources). The cloud computing environment may include a private cloud, a public cloud, or a hybrid cloud. The cloud computing environment may provide infrastructure-as-a-service (IaaS), platform-as-a-service (PaaS), or software-as-a-service (SaaS) computing. The cloud computing environment may provide serverless computing.

In one implementation, the parsing subsystem 112 may include one or more software applications configured to generate parsers and parser extensions, edit and manage parsers and parser extensions, validate parsers and parser extensions, and execute parsers and parser extensions. A user of the computing resources 130 may use a user interface on a computing device of the computing resources 130 that is in data communication with the parsing subsystem 112 to create a new parser or parser extension. The parsing subsystem 112 may then receive event log data compatible with the parser or parser extension and may execute the parser or parser extension to convert the event log data into a predefined format and store the converted event log data.

The AI subsystem 124 may include one or more software applications configured to train or execute an AI model. The AI model may be configured to generate an event log parser, generate event log parser code, or identify predefined fields to which event log keys should map. The AI model or other components of the parsing subsystem 112 may use the event log parser code or event log key-to-predefined field mappings to generate an event log parser. Further details regarding the AI subsystem 124 are described herein.

The event log analytics subsystem 114 may include one or more software applications configured to perform data analytics operations and other operations on the converted event log data to identify trends in the data, determine improved configurations for devices in the computing resources 130 that provide event log data, and perform other operations on the converted event log data. A user of the computing resources 130 may use a user interface of a computing device of the computing resources 130 that is in data communication with the event log analytics subsystem 114 to view the results of the data analytics and other operations.

The parser storage 120 may include a data store configured to store one or more parsers and one or more parser extensions. A data store may include a physical storage medium that can include volatile storage (e.g., random access memory (RAM), etc.) or non-volatile storage (e.g., a hard disk drive (HDD), flash memory, etc.). A data store can include a file system, a database, or some other software configured to store data.

A parser can include data, code, a software application, or other data configured to be executed by the parsing subsystem 112. A parser may be configured to accept an event log as input and convert at least a portion of the event log into a predefined format. The parser may be configured to perform other event log processing-related functionality.

A parser extension can include data, code, a software application, or other data configured to be executed by the parsing subsystem 112. A parser extension may be configured to augment the functionality of a parser or augment the data that a parser can operate on when executing on an event log. The parser extension may be configured to accept an event log as input and convert at least a portion of the event log into a predefined format. The parser extension may be configured to perform other event log related-operations.

The event log storage 122 may include a data store configured to store event log data. The stored event log data may include event logs prior to being operated on by the parsing subsystem 112 (sometimes referred to, herein, as "raw event logs") or may include event logs in a predefined format (e.g., after being operated on by the parsing subsystem 112). The event log storage 122 may provide raw event logs to the parsing subsystem 112, the parsing subsystem 112 may convert the raw event logs to a predefined format and store the converted event log data in the event log storage 122. The event log storage 122 may provide converted event log data in the predefined format to the event log analytics subsystem 114 for analysis.

In one or more implementations, the computing resources 130 may include a computing network. The computing resources 130 may include a computing network operated by a customer of the entity that operates the event log analytics system 110 and provides event log analytics services to the customer. The computing resources 130 may include one or more servers 132. A server 132 may include a computing device, including a physical computing device or a VM. The computing resources 130 may include one or more network devices 134. A network device 134 may include a switch, router, hub, gateway, wireless access point, bridge, modem, repeater, or other network devices. A network device 134 may help provide data communication between the one or more servers 132, between other devices of the computing resources 130, or between a computing device external to the computing resources 130 and a device of the computing resources 130. The computing resources 130 may include one or more data storage devices 136. A data storage device 136 may include a data store. One or more servers 132 or other computing devices of the computing resources 130 may store data on the one or more data storage devices 136 or retrieve data from the one or more data storage devices 136.

In one or more implementations, a computing network of the event log analytics system 110 or the computing resources 130 may include one or more computing devices in data communication with each other over a data network. The data network may include a local area network (LAN), wide area network (WAN), a virtual private network (VPN), or some other data network. The data network may include network devices, including switches, routers, hubs, gateways, wireless access points, bridges, modems, repeaters, or other network devices.

Figure 2A:
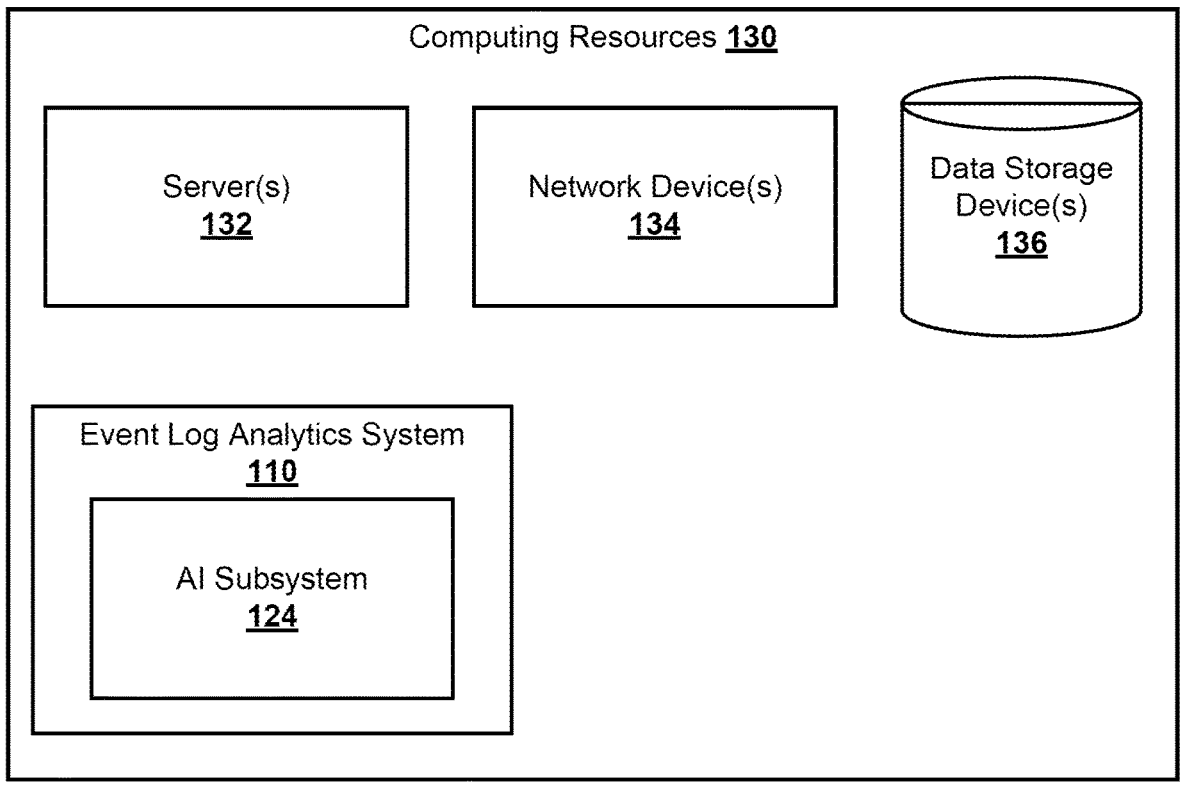
FIG. 2A schematically illustrates another example system for AI-based automated parser creation in which selected aspects of the present disclosure may be implemented, in accordance with various embodiments.
Figure 2B:
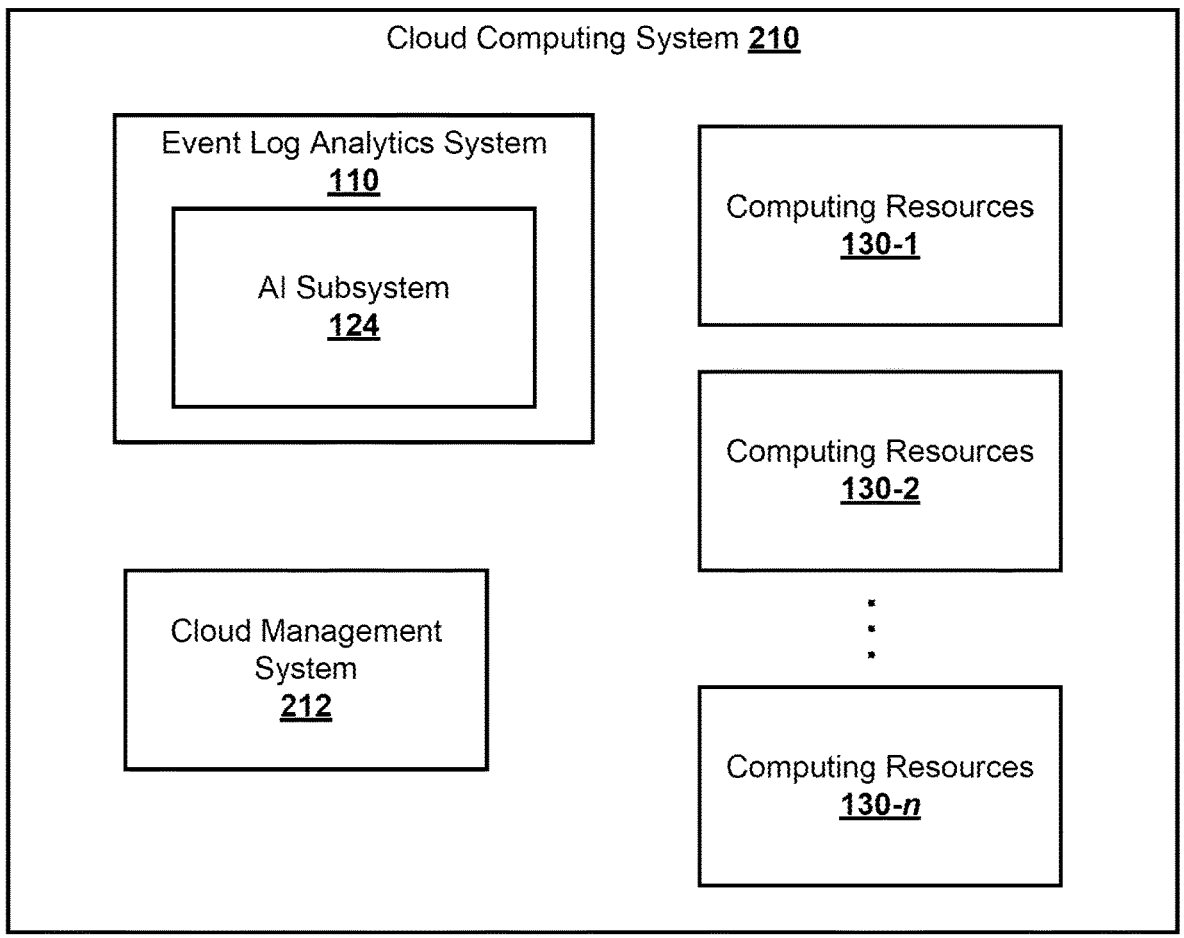
FIG. 2B schematically illustrates another example system for AI-based automated parser creation in which selected aspects of the present disclosure may be implemented, in accordance with various embodiments.

In some implementations, the event log analytics system 110 and the computing resources 130 may be separate computing networks and may communicate with each other over a data network. However, as seen in the example system 200 of FIG. 2A, in certain implementations, the computing resources 130 may include the event log analytics system 110. For example, the components of the event log analytics system 110 may be installed on one or more computing devices of the computing resources 130. The event log analytics system 110 may provide its functions locally to the computing resources 130. As seen in the example system 250 of FIG. 2B, in one or more implementations, a cloud computing system 210 may include the event log analytics system 110 and one or more sets of computing resources 130-1, . . . , 130-n. The one or more sets of computing resources 130-1, . . . , 130-n may be cloud computing environments provided by the cloud provider of the cloud computing system 210, and the cloud provider may operate the event log analytics system 110 and allow the one or more sets of computing resources 130-1, . . . , 130-n to use the event log analytics system's 110 functionality. The cloud computing system 210 may include a cloud management system 212, which may include one or more computing devices or software configured to manage the cloud computing system 210, including provisioning one or more sets of computing resources 130-1, . . . , 130-n to users or coordinate usage of the event log analytics system 110 by the one or more sets of computing resources 130-1, . . . , 130-n.

In implementations of the disclosure, a "user" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether event log analytics system 110 collects user information (e.g., information about a user's social network, social actions or activities, profession, a user's preferences, or a user's current location), or to control whether and/or how to receive content from the event log analytics system 110 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the event log analytics system 110.

FIG. 3 is a flowchart illustrating one embodiment of a method 300 for AI-based automated parser creation, in accordance with some implementations of the present disclosure. A processing device, having one or more central processing units (CPU(s)) and/or memory devices communicatively coupled to the CPU(s) and/or graphics processing units (GPU(s)) can perform the method 300 and/or each of their individual functions, routines, subroutines, or operations. In certain implementations, a single processing thread can perform the method 300. Alternatively, two or more processing threads can perform the method 300, each thread executing one or more individual functions, routines, subroutines, or operations of the method. In an illustrative example, the processing threads implementing the method 300 can be synchronized (e.g., using semaphores, critical sections, and/or other thread synchronization mechanisms). Alternatively, the processing threads implementing the method 300 can be executed asynchronously with respect to each other. Various operations of the method 300 can be performed in a different (e.g., reversed) order compared with the order shown in FIG. 3. Some operations of the method 300 can be performed concurrently with other operations. Some operations can be optional. In some embodiments, the parsing subsystem 112 or the event log analytics subsystem 114 may perform the method 300.

Block 310 may include obtaining a first event log. The first event log may include an event log of one or more first event logs of first telemetry log data. The telemetry data May include one or more event logs. The first event log may include one or more event log key-value pairs.

In some implementations, telemetry log data may include data generated by a device or a component of a device regarding metrics, measurements, events, or other aspects of a device or component during execution. In some implementations, telemetry log data may include one or more event logs. In one or more implementations, an event log may include a data record that represents an event related to a device or software of the computing resources 130. A device (including a component of a device) may generate the event log, or software may generate the event log. The event log may include data about the event represented by the event log. In some implementations, an event log may include a structured event log. A structured event log may include event data in a structured format. Event data in a structured format may include data that is organized into a recognized format. The structured event log may include event data in a Javascript Object Notation (JSON) format, an Extensible Mark-up Language (XML) format, a comma-separated values (CSV) format, or event data in some other structured format.

In one implementation, telemetry log data may include security telemetry log data, which may include one or more event logs that provide information about security-related events of a computing device. The one or more event logs may include raw event logs, e.g., event logs that have not yet been converted to a predefined format by the parsing subsystem 112. The telemetry log data may include telemetry log data provided to the event log analytics system 110 by the computing resources 130. The event log storage 122 may store the telemetry log data.

In some implementations, an event log may include one or more event log key-value pairs. An event log key-value pair may include an event log key and a value that corresponds to that event log key. An event log key may include data that indicates a category of data, and the corresponding value may include data that belongs to that category.

FIG. 4A depicts an example event log 400. The event log 400 may include a web proxy-type event log. The example event log 400 may represent the event of a computing device requesting a web resource on a server 132. The event log 400 can include one or more key-value pairs 402-1, ..., 402-9. A key-value pair 402 may include a key 404 and a corresponding value 406. The key-value pairs 402-1, ..., 402-9 of an event log 400 may include data that provide information about the event represented by the event log 400. For example, as depicted in FIG. 4A, the key-value pair 402-1 may include a "timestamp" key 404-1 and a corresponding value 406-1 of "1588059648.129," which may represent a timestamp of when the event represented by the event log 400 occurred or when the event log 400 was generated (e.g., in the example event log 400 of FIG. 4A, the value 406-1 may include a timestamp in the UNIX epoch format). The key-value pair 402-2 may include a "duration" key 404-2 and a value 406-2 of "23," which may represent a duration of the event represented by the event log 400 (e.g., in the example event log 400, the value 406-2 may be provided in milliseconds). The key-value pair 402-3 may include a "ip.client_address" key 404-3 and the value 406-3 of "192.168.23.4," which may represent the Internet Protocol (IP) address of the device that initiated the event represented by the event log 400. The key-value pair 402-4 may include a "ip.target_address" key 404-4 and the corresponding value 406-4 of "203.0.113.52," which may represent the IP address of the device that hosts the requested web resource requested in the event log 400. The key-value pair 402-5 may include a "http.result_code" key 404-5 and a corresponding value 406-5 of "TCP_HIT/200," which may represent the result code of the event represented by the event log 400. The key-value pair 402-6 may include a "http.response_length" key 404-6 and the corresponding value 406-6 of "904," which may represent a length, in bytes, of the received request for the web resource. The key-value pair 402-7 may include a "http.request_method" key 404-7 and the corresponding value "GET." The key-value pair 402-8 may include a "URL" key 404-8 and the corresponding value 406-8 "www.sample.com/image/logo.png," which may represent a uniform resource locator (URL) of a requested web resource of the event represented by the event log 400. The key-value pairs 402-9 may include a "content_type" key 404-9 and a corresponding value 406-9 of "image/JPEG," which may indicate the type of the content requested in the event of the event log 400.

In some implementations, an event log 400 may have more or fewer key-value pairs 402 than shown in FIG. 4A. An event log 400 may have different key-value pairs 402. As can be seen in FIG. 4A, in some implementations, an event log 400 may have key-value pairs 402 at different levels. For example, the "timestamp" key-value pair 402-1 may occur at a first level, and the "ip.client_address" key-value pair 402-3 may occur at a second level that is nested inside a first level. In one implementation, the parsing subsystem 112 may identify the one or more key-value pairs 402-1, ..., 402-9 of an event log 400. Identifying the one or more key-value pairs 402-1, ..., 402-9 may include traversing a structure of the event log 400 and parsing the structure into different pieces of data.

Block 320 may include generating a portion of parser code to map a first event log key 404 to a predefined field. The event log key 404 may include a first event log key 404 of a first event log key-value pair 402 of the one or more event log key-value pairs 402. Block 320 may include using an AI model to generate the portion of parser code. The parsing subsystem 112, including the AI subsystem 124, may identify a predefined field from the multiple predefined fields to create a mapping that maps an event log key 404 of a raw event log 400 to the identified predefined field. The mapping may be implemented by parser code.

As discussed above, the event log analytics subsystem 114 may use event logs in a standardized, predefined format that includes predefined fields, but different devices may provide raw event log data that is not in the predefined format. Thus, the parsing subsystem 112 may use parsers and parser extensions to convert the raw event log data into the predefined format. Part of that parsing may include mapping event log keys 404 in a raw event log 400 to predefined fields.

In one or more implementations, a predefined field may include a data field in a predefined, standardized format. The predefined format may include a format compatible with event log analytics functions of the event log analytics subsystem 114. In one implementation, the event log analytics system 110 may include multiple predefined fields. The multiple predefined fields may be stored by the parsing subsystem 112 (e.g., in the parser storage 120). The event log analytics system 110 may store the multiple predefined fields in a data structure (e.g., a list, a set, or some other data structure). The predefined fields may include predefined data fields recognized by the event log analytics subsystem 114.

In some implementations, the parser storage 120 may include data indicating a predefined event type. Similar to how a predefined field includes data in a predefined, standardized format, a predefined event type can include data in a predefined, standardized format that provides information about a type of event that occurred on a computing device or in a software application. In this manner, the event log analytics system 110 may include a standard way to represent an event type, even when different raw logs 400 indicate the same event type in different ways. For example, as mentioned above, the event type for the example event log 400 of FIG. 4 is a computing device requesting a web resource on a server. Different event logs 400 from different computing devices may represent this type of event in different ways, but the event logs analytics system 110 may represent this event type using predefined, standardized data. The predefined event type data may be logically associated with a portion of parser code or a predefined field to indicate that the parser code or predefined field is associated with that event type.

FIG. 4B depicts an example set 430 of mappings 432-1, ..., 432-7 for the event log 400 of FIG. 4A. The set 430 of mappings 432-1, ..., 432-7 may include one or more mappings 432 that indicate which event log keys 404 of the raw event log 400 map to which predefined field 434 of the predefined format. For example, the "timestamp" key 404-1 of the event log 400 may map to the predefined field 434-1 "metadata.event_timestamp." The "ip.client_address" key 404-3 may map to the predefined field 434-2 "principal.ip," the "ip.target_address" key 404-4 may map to the predefined field 434-3 "target.ip," the "http.result_code" key 404-5 may map to the predefined field 434-4 "network.http.response_code," the "http.response_length" key 404-6 may map to the predefined field 434-5 "network.http.received_bytes," the event log key 404-7 "http.request_method" may map to the predefined field 434-6 "network.http.method," and the key 404-8 "URL" may map to the predefined field 434-7 "target.url."

As can be seen from the example set 430 of mappings 432-1, ..., 432-7 of FIG. 4B, in some implementations, certain keys 404 in an event log 400 may not map to a predefined field 434. For example, the "duration" key 404-2 and the "content_type" key 404-9 may not map to corresponding predefined fields 434. This may result from the event log analytics subsystem 114 not needing the data stored in these key-value pairs 402. In one or more implementations, an event log key 404 may include the same name as the corresponding predefined field 434, or an event log key 404 may include a different name from the corresponding predefined field 434.

A parser may include data or software that may execute on an event log to convert a raw event log to the predefined format according to the set 430 of mappings 432-1, . . . , 432-7. The data or software may include parser code. Parser code may include one or more computer instructions that cause a parser or parser extension to execute parser functionality. Parser functionality may include mapping event log keys 404 to predefined fields 434.

In some implementations, the parser code may include computer-executable instructions. Computer-executable instructions may include binary machine code, assembly code, or other similar code. In certain implementations, the parser code may include human-readable source code. The source code may be configured to be compiled into computer-executable instructions. In one implementation, the event log analytics system 110 may present the at least a portion of the source code of the parser code on a user interface. The user interface may include a portion where a user can modify the source code (e.g., a text input area where the user can modify the text of the source code). The event log analytics system 110 may store the parser source code as modified by the user.

Figure 5:
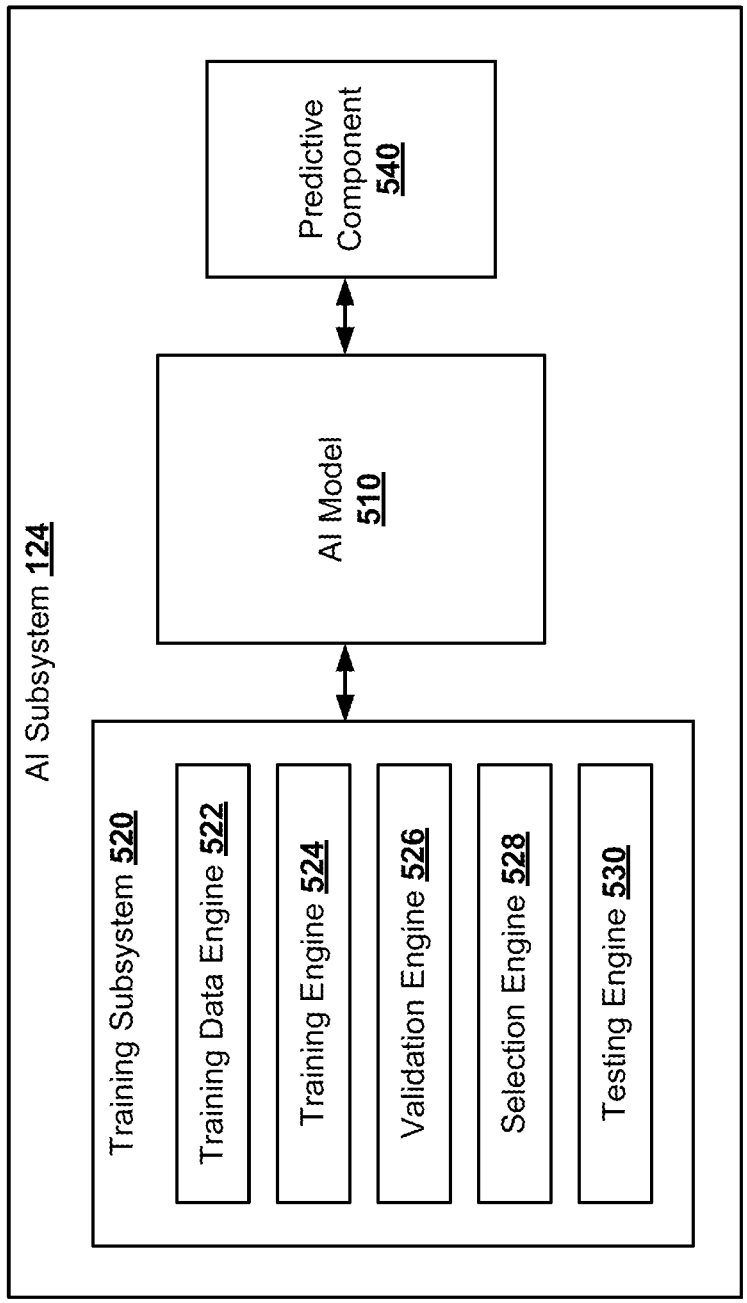
FIG. 5 schematically illustrates an example AI subsystem for AI-based automated parser creation in which selected aspects of the present disclosure may be implemented, in accordance with various embodiments.

FIG. 5 illustrates an example AI subsystem 124, in accordance with implementations of the present disclosure. As illustrated in FIG. 5, the AI subsystem 124 can include an AI model 510. The AI subsystem 124 may include a training subsystem 520, which may include a training data engine 522, a training engine 524, a validation engine 526, a selection engine 528, or a testing engine 530. The AI subsystem 124 may include a predictive component 540. In some embodiments, the AI subsystem 124 may be part of the parsing subsystem. Alternatively, the AI subsystem 124 may not be part the parsing subsystem 112 and may instead be part of another system or subsystem or be an independent system, and may only include the training subsystem 520 that can train AI model 510 and provide it to the parsing subsystem 112, which may include the trained AI model 510-, and the predictive component 540.

In one embodiment, the AI model 510 may include one or more artificial neural networks (ANNs), decision trees, random forests, support vector machines (SVMs), clustering-based models, Bayesian networks, or other types of machine learning models. ANNs generally include a feature representation component with a classifier or regression layers that map features to a target output space. The ANN can include multiple nodes ("neurons") arranged in one or more layers, and a neuron may be connected to one or more neurons via one or more edges ("synapses"). The synapses may perpetuate a signal from one neuron to another, and a weight, bias, or other configuration of a neuron or synapse may adjust a value of the signal. Training the ANN may include adjusting the weights or other features of the ANN based on an output produced by the ANN during training.

An ANN may include, for example, a convolutional neural network (CNN), recurrent neural network (RNN), or a deep neural network. A CNN, a specific type of ANN, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of ANN that includes a memory to enable the ANN to capture temporal dependencies. An RNN is able to learn input-output mappings that depend on both a current input and past inputs. The RNN will address past and future measurements and make predictions based on this continuous measurement information. One type of RNN that may be used is a long short term memory (LSTM) neural network.

ANNs may learn in a supervised (e.g., classification) or unsupervised (e.g., pattern analysis) manner. Some ANNs (e.g., such as deep neural networks) may include a hierarchy of layers, where the different layers learn different levels of representations that correspond to different levels of abstraction. In deep learning, each level learns to transform its input data into a slightly more abstract and composite representation.

In some embodiments, the AI model 510 may include a natural language processing (NLP) model. An NLP model may include an AI model that has been trained on a large corpus of text data to learn the patterns and rules of language. An NLP model may be configured to perform a variety of tasks, such as machine translation, text summarization, word association, and other tasks.

In one embodiment, the AI model 510 may include a generative AI model. A generative AI model can deviate from a machine learning model based on the generative AI model's ability to generate new, original data, rather than making predictions based on existing data patterns. A generative AI model can include a generative adversarial network (GAN), a variational autoencoder (VAE), or a large language model (LLM). In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

In some embodiments, the AI model 510 can be an AI model that has been trained on a corpus of data. In some embodiments, the AI model 510 can be a model that is first pre-trained on a corpus of data to create a foundational model, and afterwards fine-tuned on more data pertaining to a particular set of tasks to create a more task-specific, or targeted, model. The foundational model can first be pre-trained using a corpus of data that can include data in the public domain, licensed content, and/or proprietary content.

Such a pre-training can be used by the AI model 510 to learn broad elements including, image or speech recognition, general sentence structure, common phrases, vocabulary, natural language structure, and other elements. In some embodiments, this first, foundational model can be trained using self-supervision, or unsupervised training on such datasets.

In some embodiments, the AI model 510 can then be further trained or fine-tuned on organizational data, including proprietary organizational data. The AI model 510 can also be further trained or fine-tuned on sample event logs 400, event log parser code, predefined fields 434, event log key 404-to-predefined field 434 mappings, or other data stored by the parser storage 120.

In some embodiments, the second portion of training, including fine-tuning, may be unsupervised, supervised, reinforced, or any other type of training. In some embodiments, this second portion of training may include some elements of supervision, including learning techniques incorporating human or machine-generated feedback, undergoing training according to a set of guidelines, or training on a previously labeled set of data, etc. In a non-limiting example associated with reinforcement learning, the outputs of the AI model 510 while training may be ranked by a user, according to a variety of factors, including accuracy, helpfulness, veracity, acceptability, or any other metric useful in the fine-tuning portion of training. In this manner, the AI model 510 can learn to favor these and any other factors relevant to users when generating a response. Further details regarding training are provided below.

In some embodiments, the AI model 510 may include one or more pre-trained models, or fine-tuned models. In a non-limiting example, in some embodiments, the goal of the "fine-tuning" may be accomplished with a second, or third, or any number of additional models. For example, the outputs of the pre-trained model may be input into a second AI model that has been trained in a similar manner as the "fine-tuned" portion of training above. In such a way, two more AI models may accomplish work similar to one model that has been pre-trained, and then fine-tuned.

As indicated above, the AI model 510 may be one or more generative AI models, allowing for the generation of new and original content. The generative AI model can use other machine learning models including an encoder-decoder architecture including one or more self-attention mechanisms, and one or more feed-forward mechanisms. In some embodiments, the generative AI model can include an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative AI model can also utilize the previously discussed deep learning techniques, including RNNs, CNNs, or transformer networks. Further details regarding generative AI models are provided herein.

In some implementations, the AI model 510 may be trained on training data in order to configure the AI model 510 to automatically identify predefined fields 434 that event log keys 404 should map to. The AI model 510 may be trained on training data in order to configure the AI model 510 to automatically generate parser code that maps event log keys 404 to predefined fields 434.

In one implementation, the training subsystem 520 may manage the training and testing of the AI model 510. The training data engine 522 may generate training data (e.g., a set of training inputs or a set of target outputs) to train the AI model 510. In an illustrative example, the training data engine 522 can initialize a training set T to null (e.g., { }). The training data engine 522 can obtain one or more portions of parser code. The portions of parser code may include already-existing parser code stored by the parser storage 120. These portions of already existing parser code may include the parser code of other event log parsers. The training data engine 522 may obtain one or more event log keys 404. The training data engine 522 may obtain one or more of the predefined fields 434 stored by the parser storage 120. In some cases, a predefined field 434 may include metadata that provides information about the predefined field 434. The information may include information provided by a user of the event log analytics system 110. The training data engine 522 may obtain data indicating a predefined event type. The training data engine may use these categories of obtained data to create training data.

In some implementations, the training data may include a combination of one or more of the previous categories of training data. In one example, a piece of training data may include a sample event log 400 and the parser code that corresponds to the sample event log 400. The parser code may include code that was written by a user of the event log analytics system 110, parser code that was generated by an AI model (whether the AI model 510 or some other AI model), or parser code that was generated by the parsing subsystem 112 in some other way. The piece of training data may also include data indicating a corresponding predefined event type for the sample event log 400. In another example, a piece of training data may include a sample event log 400 and data indicating mappings from the event log keys 404 of the sample event log 400 to predefined fields 434.

The training data engine 522 may add the training data to the training set T and may determine whether the training set T is sufficient for training the AI model 510. The training set T can be sufficient for training the AI model 510 if the training set T includes a threshold amount of training data, in some embodiments. In response to determining that the training set T is not sufficient for training, the training data engine 522 can identify additional event logs 400, parser code, predefined fields 434, etc. to use as training data. In response to determining that the training set T is sufficient for training, the training data engine 522 may provide the training set T to the training engine 524.

The training engine 524 can train the AI model 510 using the training data (e.g., the training set T). The AI model 510 may refer to the model artifact that is created by the training engine 524 using the training data, where such training data can include training inputs and, in some implementations, corresponding target outputs (e.g., correct answers for respective training inputs). The training engine 524 can input the training data into the AI model 510 so that the AI model 510 may find patterns in the training data and configure itself based on those patterns.

Where the AI model 510 uses supervised learning, the training engine 524 may assist the AI model 510 in determining whether the AI model 510 maps the training input to the target output (the answer to be predicted). Where the AI model 510 uses unsupervised learning, the training engine 524 may input the training data into the AI model 510. The AI model 510 may configure itself based on the input training data, but since the training data may not include a target output, the training engine 524 may not assist the AI model 510 in determining whether the AI model 510 provided a correct output during the training process.

The validation engine 526 may be capable of validating a trained AI model 510 using a corresponding set of features of a validation set from the training data engine 522. The validation engine 526 may determine an accuracy of each of the trained AI models 510 based on the corresponding sets of features of the validation set. Where the training data may not include a target output, validating a trained AI model 510 may include obtaining an output from the AI model 510 and providing the output to another entity for evaluation. The other entity may include another AI model configured to evaluate the output of the AI model that is undergoing training. The other entity may include a human. The validation engine 526 may discard a trained AI model 510 that has an accuracy that does not meet a threshold accuracy or that otherwise fails evaluation. In some embodiments, the selection engine 528 may be capable of selecting a trained AI model 510 that has an accuracy that meets a threshold accuracy. In some embodiments, the selection engine 528 may be capable of selecting the trained AI 510 model that has the highest accuracy of multiple trained AI models 510. In some implementations, the selection engine 528 may receive input from another AI model or a human and may select a trained AI model 510 based on the input.

The testing engine 530 may be capable of testing a trained AI model 510 using a corresponding set of features of a testing set from the training data engine 522. For example, a first trained AI model 510 that was trained using a first set of features of the training set may be tested using the first set of features of the testing set. The testing engine 530 may determine a trained AI model 510 that has the highest accuracy or other evaluation of all of the trained AI models 510 based on the testing sets.

In some embodiments, once the AI model 510 is trained, the AI subsystem 124 may use the AI model 510 to identify predefined fields 434 to which event log keys 404 should map or to generate parser code that implements mappings from event log keys 404 to predefined fields 434. The predictive component 540 of the AI subsystem 124 may be configured to feed data as input to the AI model 510 and obtain one or more outputs. In such embodiments, the predictive component 540 can feed the first event log 400 as input to the AI model 510 and obtain one or more outputs, which may include parser code or mappings from event log keys 404 to predefined fields 434.

In one implementation, the AI model 510 may include a clustering-based AI model. Each data point may correspond to an event log key 404. An event log key 404 may come from the training data. Each cluster may correspond to a predefined field 434. The AI model 510 may accept, as input, a raw event log 400. The AI model 510 may iteratively select each event log key 404 in the event log 400 and calculate where the event log key 404 should be placed in the dataspace. The AI model 510 may then determine to which cluster the data point corresponding to the event log key 404 belongs. The AI model 510 may then identify the predefined field 434 to which the determined cluster belongs and map the event log key 404 to the identified predefined field 434. The parsing subsystem 112 may then use the event log key 404-to-predefined field 434 mappings 432 to generate the parser code. The AI model 510 may use k-means clustering, fuzzy clustering, or some other clustering algorithm.

In some implementations where the AI model 510 includes a clustering-based AI model, each datapoint may correspond to an event log value 406. An event log value 406 may come from the training data. Each cluster may correspond to a predefined field 434. The AI model 510 may accept, as input a raw event log 400. The AI model 510 may iteratively select each event log value 406 in the event log 400 and calculate where the event log value 406 should be placed in the dataspace. The AI model 510 may then determine to which cluster the data point corresponding to the event log value 406 belongs. The AI model 510 may then identify the predefined field 434 to which the determined cluster belongs and map the event log key 404 that corresponds to the value 406 to the identified predefined field 434. The parsing subsystem 112 may then use the event log key 404-to-predefined field 434 mappings 432 to generate the parser code.

In one implementation, the AI model 510 may use a distance comparison between an event log key 404 and a predefined field 434 to determine whether the event log key 404 should map to the predefined field 434. The distance comparison may include a text string distance comparison between the text of the event log key 404 and the text of the predefined field 434. The distance comparison may include a Levenshtein distance computation, a Hamming distance computation, a Damerau-Levenshtein distance computation, or some other type of text string distance computation. The AI model 510 may identify the predefined field 434 that has the smallest distance from the event log key 404 as the predefined field 434 to which the event log key 404 should map. The parsing subsystem 112 may then use the event log key 404-to-predefined field 434 mappings 432 to generate the parser code.

As indicated above, in some embodiments, the AI model 510 can include an LLM. In some embodiments, the LLM can include generative AI functionality. In such embodiments, the AI model 510 can generate new content based on provided input data (e.g., an event log 400). The generative AI model 510 can be supported by a prompt subsystem (not shown), which may reside on the AI subsystem 124. The prompt subsystem may be configured to perform automated identification of, and facilitate retrieval of, relevant and timely contextual information for efficient and accurate processing of prompts by the AI model 510. The prompt subsystem may be in communication with the parser storage 120 or the event log storage 122. Communications between the prompt subsystem and the predictive component 540 may be facilitated by a generative model application programming interface (API), in some embodiments. Communications between the prompt subsystem and the parser storage 120 or the event log storage 122 may be facilitated by a data management API. In additional or alternative embodiments, the generative model API can translate prompts generated by the prompt subsystem into unstructured natural-language format and, conversely, translate responses received from the AI model 510 into any suitable form (e.g., including any structured proprietary format as may be used by the prompt subsystem). Similarly, the data management API can support instructions that may be used to communicate data requests to generate parser code that maps event log keys 404 of an event log 400 to predefined fields 434 and may format data received from such components.

In some embodiments, the prompt subsystem can include a prompt analyzer to support various operations of the AI subsystem 124. For example, the prompt analyzer May receive an input (e.g., a prompt submitted by the parsing subsystem 112) and generate one or more intermediate prompts to the generative AI model 510 to determine what type of data the generative AI model may need to successfully respond to the input. Responsive to receiving a response from the generative AI model 510, the prompt analyzer may analyze the response, form a request for relevant contextual data for the parser storage 120 or the event log storage 122, which may then supply such data. The prompt analyzer may then generate a prompt to the generative AI model 510 that includes the original prompt and the contextual data. In some embodiments, the prompt analyzer may, itself, include a lightweight generative AI model that may process the intermediate prompt(s) and determine what type of contextual data may be needed by the generative AI model 510 together with the original prompt to ensure a meaningful response from the generative AI model 510.

In one implementation, the parsing subsystem 112 may generate an LLM prompt. The LLM prompt may include the first event log 400. The LLM prompt may include a command to the AI model 510 to generate parser code to map the event log keys 404 of the first event log 400 to predefined fields 434. The LLM prompt may include context information (e.g., metadata associated with the first event log 400). The parsing subsystem 112 may submit the LLM prompt to the prompt subsystem, discussed above. The prompt subsystem may operate on the LLM prompt and provide the prompt to the predicted component 540. The predictive component 540 may input the LLM prompt into the generative AI model 510. The generative AI model 510 may generate parser code that performs the mapping of the event log keys 404 to predefined fields 434.

In one implementation, the AI model 510 may include an NLP model. The AI model 510 may accept, as input, the event log key 404. The AI model 510 may determine, using natural-language processing, which predefined field 434 is most associated with event log key 404 using word association or other NLP operations.

In some embodiments, the AI model 510 generating a portion of parser code to map the first event log key 404 to the predefined field 434 may include the AI model 510 identifying the predefined field 434 to which the first event log key 404 should be mapped and the parsing subsystem 112 generating the parser code that implements the mapping 432. Generating the parser code may include using pre-generated portions of code where the event log key 404 and the predefined field 434 are indicated by variables or other data that can be filled in, and the parsing subsystem 112 filling in the variables or other data using the mapping 432 indicated by the AI model 510.

Block 330 includes generating an event log parser that includes the one or more portions of the parser code generated in block 320. Generating the event log parser may include associating the one or more portions of the parser code with the event log parser.

Block 340 includes causing the event log parser to be executed on a second event log 400 of one or more second event logs 400 of second telemetry log data. In some implementations, the second telemetry log data may include telemetry log data that is separate from the first telemetry log data, or there may be at least some overlap between the first and second telemetry log data. Similarly, the one or more second event logs 400 may include event logs 400 that are not present in the one or more first event logs of block 310, or there may be at least some overlap between the first and second one or more event logs 400. In some implementations, the event logs 400 of the one or more second event logs 400 may include the event type associated with the parser.

In some implementations, causing the event log parser to be executed may include the parsing subsystem 112 to execute the parser. In certain implementations, causing the event log parser to be executed may include another component of the event log analytics system 110 executing the parser in response to a command from the parsing subsystem 112. In other implementations, causing the event log parser to be executed may include an computing device external from the event log analytics system 110 executing the parser in response to a command from the parsing subsystem 112.

In one implementation, execution of a parser may include execution of one or more portions of the parser's parser code by a computing device. Execution of the portions of the parser code may include executing the portions of the parser code on multiple event log key-value pairs 402 of the second structured event log 400. Execution of the parser code may include mapping a value 406 in a key-value pair 402 of the second structured event log 400 to a predefined field 434 based on a mapping 432. This may include identifying a key 404 of a key-value pair 402 of the event log 400, identifying the value 406 in the key-value pair 402, and setting the value of a predefined field 434 as that value 406 based on the mapping 432 that maps the identified event log key 404 to the predefined field 434. The predefined field 434 and the value 406 can then be inserted into a data object in the predefined format that is compatible with the event log analytics subsystem 114. Execution of the parser may include execution of the functionality in addition to mapping event log keys 404 to predefined fields 434.

In some implementations, execution of the parser may include the parser generating a data object. The data object may be in a standardized, predefined format that is compatible with the event log analytics subsystem 114. FIG. 6 depicts a data object 600 that represents the event log 400 converted into the predefined format according to the set 430 of mappings 432-1, . . . , 432-7 implemented by the event log parser. The data object 600 may be in the JSON format. The data object 600 may include one or more predefined field-value pairs 602-1, . . . , 602-10. Each predefined field-value pair 602 may include a predefined field 434 and a corresponding value 604. The corresponding value 604 may include a value mapped from the raw event log 400 to a predefined field 434 according to the set 430 of mappings 432-1, . . . , 432-7.

In one implementation, some of the predefined fields 434 may include predefined fields 434 from the set 430 of mappings 432. Some of the predefined fields 434 may include a predefined field 434 that is not from the set 430 of mappings. For example, as can be seen in FIG. 6, the data object 600 may include the predefined field-value pairs 602-8, 602-9, and 602-10, which may include a "metadata.event_type" predefined field 434-8 (whose value 604-8 may include data indicating the event type represented by the event log 400), a "metadata.product_name" predefined field 434-9 (whose value 604-9 may include data indicating the device or software that generated the event log 400), and a "metadata.vendor_name" predefined field 434-10 (whose value 604-10 may include data indicating the device's or software's vendor that generated the event log 400).

FIG. 7 is a flowchart illustrating one embodiment of a method 700 for AI-based automated parser creation, in accordance with some implementations of the present disclosure. A processing device, having one or more CPU(s) and/or memory devices communicatively coupled to the CPU(s) and/or GPU(s) can perform the method 700 and/or each of their individual functions, routines, subroutines, or operations. In certain implementations, a single processing thread can perform the method 700. Alternatively, two or more processing threads can perform the method 700, each thread executing one or more individual functions, routines, subroutines, or operations of the method. In an illustrative example, the processing threads implementing the method 700 can be synchronized (e.g., using semaphores, critical sections, and/or other thread synchronization mechanisms). Alternatively, the processing threads implementing the method 700 can be executed asynchronously with respect to each other. Various operations of the method 700 can be performed in a different (e.g., reversed) order compared with the order shown in FIG. 7. Some operations of the method 700 can be performed concurrently with other operations. Some operations can be optional. In some embodiments, the parsing subsystem 112 or the event log analytics subsystem 114 may perform the method 700.

Block 710 includes obtaining a first event log 400 of one or more first event logs 400 of first telemetry data. The first event log 400 can include one or more event log key-value pairs 402. Block 710 may include functionality similar to the functionality of block 310 of the method 300 of FIG. 3.

Block 720 may include identifying, from among one or more predefined fields 434 and by using a clustering-based AI model 510, a predefined field 434 for an event log key 404 of a first event log key-value pair 402 of the one or more key value pairs 402. Identifying the predefined field 434 using the clustering-based AI model 510 may include inputting the event log key 404 into the AI model 510. The AI model 510 may calculate a data point that corresponds to the event log key 404. The AI model 510 may use a k-means clustering calculation to calculate the data point. The AI model 510 may use a fuzzy clustering calculation to calculate the data point. The AI model 510 may determine to which cluster the data point corresponding to the event log key 404 belongs. The AI model 510 may then identify the predefined field 434 to which the determined cluster belongs. In some implementations, each datapoint of the cluster of the clustering-based AI model 510 may correspond to an event log value 406. Identifying the predefined field 434 using the clustering-based AI model 510 may include inputting the event log value 406 into the clustering-based AI model 510. The AI model 510 may calculate a data point that corresponds to the event log value 406. The AI model 510 may determine to which cluster the data point corresponding to the event log value 406 belongs. The AI model 510 may then identify the predefined field 434 to which the determined cluster belongs.

Block 730 may include generating a portion of parser code to map the event log key 404 to the identified predefined field 434. The parsing subsystem 112 may map the event log key 404 of block 710 to the predefined field identified in block 720. The mapping 432 may be implemented by parser code. The parsing subsystem 112 may generate the parser code. Block 730 may include some of the functionality of block 320 of the method 300.

Block 740 may include generating an event log parser that includes the portion of the parser code generated in block 730. Block 740 may include functionality similar to block 330 of the method 300. Block 750 may include causing the event log parser to be executed on a second event log 400 of second multiple event logs 400 of second telemetry log data. Block 750 may include functionality similar to block 340 of the method 300.

FIG. 8 is a flowchart illustrating one embodiment of a method 800 for AI-based automated parser creation, in accordance with some implementations of the present disclosure. A processing device, having one or more CPU(s) and/or memory devices communicatively coupled to the CPU(s) and/or GPU(s) can perform the method 800 and/or each of their individual functions, routines, subroutines, or operations. In certain implementations, a single processing thread can perform the method 800. Alternatively, two or more processing threads can perform the method 800, each thread executing one or more individual functions, routines, subroutines, or operations of the method. In an illustrative example, the processing threads implementing the method 800 can be synchronized (e.g., using semaphores, critical sections, and/or other thread synchronization mechanisms). Alternatively, the processing threads implementing the method 800 can be executed asynchronously with respect to each other. Various operations of the method 800 can be performed in a different (e.g., reversed) order compared with the order shown in FIG. 8. Some operations of the method 800 can be performed concurrently with other operations. Some operations can be optional. In some embodiments, the parsing subsystem 112 or the event log analytics subsystem 114 may perform the method 800.

Block 810 includes obtaining a first event log 400 of one or more first event logs 400 of first telemetry data. The first event log 400 can include one or more event log key-value pairs 402. Block 810 may include functionality similar to the functionality of block 310 of the method 300 or block 710 of the method 700.

Block 820 may include identifying, from among one or more predefined fields 434 and by using an AI model 510, a predefined field 434 for an event log key 404 of a first event log key-value pair 402 of the one or more event log key-value pairs 402. Block 720 may include functionality similar to block 720 of the method 700. However, unlike block 720, the AI model 510 of block 820 may include a type of AI model 510 other than a clustering-based AI model 510. The type of AI model 510 may include a type of AI model 510 discussed herein (e.g., an ANN, an LLM, or some other type of AI model 510).

Block 830 may include generating a portion of parser code to map the event log key 404 to the identified predefined field 434. The parsing subsystem 112 may map the event log key 404 of block 810 to the predefined field 434 identified in block 820. The mapping 432 may be implemented by parser code. The parsing subsystem 112 may generate the parser code. Block 830 may include some of the functionality of block 320 of the method 300 or block 730 of the method 700.

Block 840 may include generating an event log parser that includes the portion of the parser code generated in block 830. Block 840 may include functionality similar to block 330 of the method 300 or block 740 of the method 700. Block 850 may include causing the event log parser to be executed on a second event log 400 of second multiple event logs 400 of second telemetry log data. Block 850 may include functionality similar to block 340 of the method 300 or block 750 of the method 700.

In one implementation, identifying the first predefined field 434 for the event log key 404 (block 820) may include, for each predefined field 434 in the one or more predefined fields 434, calculating, using the AI model 510, a score for the predefined field 434. The score may include a metric indicating a confidence in the corresponding predefined field 434 as the predefined field 434 that the event log key 404 maps to. The score may include a confidence score generated by the AI model 510, a probability, or some other metric. Block 820 may further include presenting, on a user interface (UI), the one or more predefined fields 434. The one or more predefined fields 434 may be displayed on the UI in an order based on the respective calculated scores for the one or more predefined fields 434. Block 820 may further include obtaining an input, from the UI, indicating the predefined field 434. The indicated predefined field 434 may serve as the identified predefined field 434. In some implementations, obtaining the input from the UI may include obtaining text data that was input into the UI. In one or more implementations, the method 800 may further include updating the AI model 510 based on the first predefined field 434.

Figure 9:
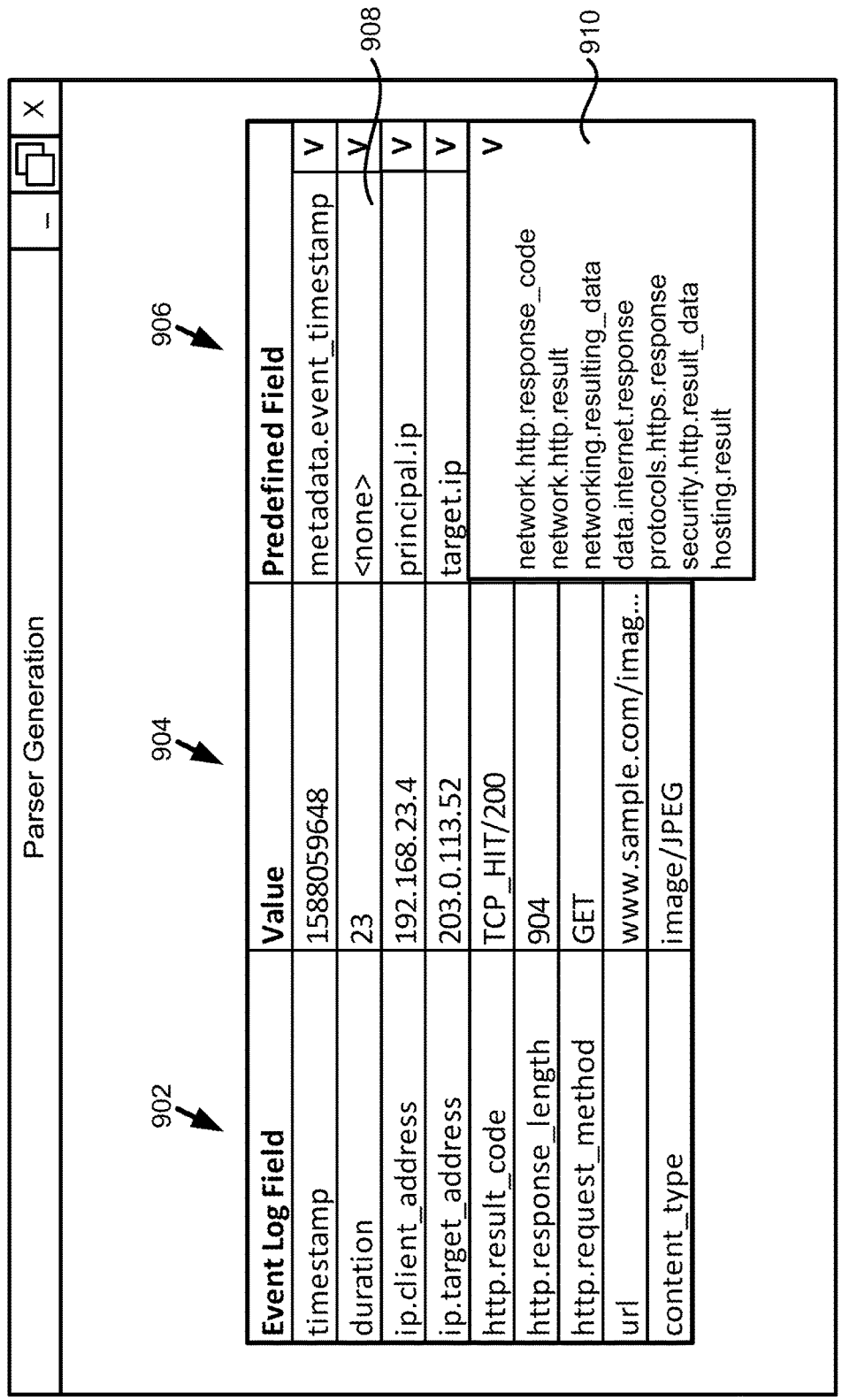
FIG. 9 schematically illustrates an example user interface for identifying predefined fields in which selected aspects of the present disclosure may be implemented, in accordance with various embodiments.

As an example, FIG. 9 depicts an example UI 900 for identifying one or more predefined fields 434. The parsing subsystem 112 may display the UI 900 as part of block 320, 720, or 820. The UI 900 may include one or more columns 902, 904, or 906. For example, a first column 902 may list the event log keys 404 in the first event log 400. A second column 904 may list the values 406 for the corresponding event log keys 404 listed in the first column 902. A third column 906 may list the predefined fields 434 identified by the AI model 510 as the predefined fields 434 that the event log keys 404 of the first column 902 should map to. The predefined fields 434 identified by the AI model 510 may include the predefined fields 434 identified in block 320, 720, or 820.

In some implementations, an element of the third column 906 may include a user input area 908 where a user can provide user input to identify the predefined field 434 that an event log key 404 should map to. The user input area 908 may be prepopulated with the predefined field 434 that the AI model 510 identified in block 320, 720, or 820. In one implementation, the user input area 908 may include a list 910 of possible predefined fields 434. For example, as depicted in FIG. 9, the list 910 may include a drop-down list. The parsing subsystem 112 may determine a displayed order of the predefined fields 434 in the list 910 based on an output of the AI model 510. The AI model 510 may provide an output that includes (1) multiple predefined fields 434 that the event log key 404 could map to, and (2) for each predefined field 434, a corresponding score. The score may include a confidence score, a probability, or some other metric. The list 910 may be in order from highest metric to lowest. The list 910 may allow a user of the UI 900 to select predefined field 434 in the list 910, and the parsing subsystem 112 may map the event log key 404 to the selected predefined field 434. The user input area 908 may, in some embodiments, allow the user to enter a text data input to be used as the predefined field 434.

In response to the user interacting with a "Finish" or "Submit" button of the UI 900, the UI 900 may send the predefined fields 434 in the third column 906 to the parsing subsystem 112 to generate the mappings 432. In some implementations, one or more predefined fields 434 in the third column 906 (whether identified by the AI model 510 or input by a user of the UI 900) may be used by the AI subsystem 124 to generate training data or other data that the AI subsystem 124 may use to update the AI model 510.

In some implementations, the method 300, 700, or 800 may include validating the event log parser. Validating the parser may include testing the performance of the parser on at least a subset of the one or more first event logs 400 of the first telemetry log data. As discussed above, the first telemetry log data may include one or more event logs 400. The parsing subsystem 112 may obtain a subset of these event logs 400 and test the parser on the subset of event logs 400. Testing the parser may include the parser executing on the subset of event logs 400.

In one implementation, testing the performance of the parser may include determining whether the parser successfully executes on at least a predetermined percentage of the subset of event logs 400. The parser successfully executing on an event log 400 may include the parser executing on the event log 400 without producing an error or without producing a critical error. The parser successfully executing on an event log 400 may include the parser correctly mapping the values 406 of the key-value pairs 402 in the event log 400 to their corresponding predefined field 434 based on the parser's set 430 of mappings 432-1, . . . , 432-7. In response to the parser successfully executing on at least the predetermined percentage of the subset of event logs 400, the parser may pass the performance test. Otherwise, the parser may fail the performance test.

In some implementations, testing the performance of the event log parser may include calculating a length of time of executing the parser on the subset of event logs 400 and determining whether the length of time is below a threshold time length. In response to the length of time being above the threshold time length, the parser may fail the performance test. In response to the parser's length of time being below the threshold amount of time, the parser may pass the performance test.

In one or more implementations, testing the performance of the parser may include analyzing other performance metrics of the parser. In response to the parser's performance metric being below a threshold metric, the parser may pass the performance test. Otherwise, the parser may fail the performance test. A performance metric may include an execution time of the parser, a computing resource used by the parser, the number of event logs 400 dropped by the parser, or other performance metrics.

In one or more implementations, testing the performance of the parser may include determining whether a predefined field 434 of a data object 600 does not include an associated value 604. In other words, testing the parser may include determining whether the converted event log 400, in its predefined format (e.g., in the form of the data object 600), includes any predefined fields 434 that are empty. An empty predefined field 434 may indicate that the parser is not functioning properly. In response to the parser converting at least a threshold amount of the subset of event logs 400 without empty predefined fields 434, the parser may pass the performance test. Otherwise, the parser may fail the performance test.

In some implementations, testing the performance of the parser may include determining whether the value 604 of a predefined field 434 is within a predetermined range for that predefined field 434. In some cases, the parser may normalize the value 604. In response to the parser converting at least a threshold number of the subset of event logs 400 with values 604 within their respective predefined fields' 434 predetermined ranges, the parser may pass the performance test. Otherwise, the parser may fail the performance test. The predetermined range may include a range set by the user creating the parser or may be based on configuration data in the parsing subsystem 112. As an example, a predefined field 434 may be configured to accept a value with a timestamp format. The predefined field 434 may be configured such that the predetermined range for the predefined field 434 includes timestamps prior to the event log analytics system's 110 current time.

In certain implementations, testing the performance of the parser may include determining whether the parser set a predefined field 434 to an incorrect value 604. In response to the parser setting a predefined field 434 to an incorrect value 604 for at least a threshold number of the subset of event logs 400, the parser may fail the performance test. Otherwise, the parser may pass the performance test.

In some implementations, validating the parser may occur after the parser has been generated. In certain implementations, certain validation functionality may occur while the parser is being created or configured. For example, in response to a set 430 of mappings 432 including a certain predefined field 434, the parsing subsystem 112 may require the set 430 of mappings 432 to include a predetermined required predefined field 434. Validating the parser may include determining whether the set 430 includes the predetermined required predefined field 434. In response to the set 430 not including the predetermined required predefined field 434, the parsing subsystem 112 may not validate the parser and may alert, using a user interface, the user creating or configuring the parser of the absence of the predetermined required predefined field 434. The parsing subsystem 112 may include other validation functionality that occurs while a user is creating or configuring a parser.

In one implementation, the event log parser generated using the method 300, 700, or 800 may include a parser extension. The parsing subsystem 112 may associate the parser extension with a parser. The associated parser may include a parser that is being augmented (which may sometimes be referred to, herein, as the "base parser"). Associating the parser extension with the base parser may include generating a logical link in the parser storage 120 from the base parser to the parser extension or vice versa. In some cases, the parser extension may be associated with an event type (which may include an event type that the base parser may accept as input). Generating and executing the parser extension may be similar to generating and executing a parser, as discussed herein.

In some implementations, the method 300, 700, or 800 may further include performing one or more data analysis operations on a data object 600. The data object 600 may have been generated as part of, or in response to, the parser executing on an event log 400 as part of block 340, 750, or 850. Performing the one or more data analysis operations may include performing a statistical analysis on the data object 600, performing an inference calculation on the data object 600 using one or more MLMs, inputting the data object 600 into an artificial intelligence (AI) model, or performing some other type of data analysis operation. In some implementations, performing the one or more data analysis operations may include performing the one or more data analysis operations on multiple data objects 600. Performing the one or more data analysis operations may include identifying trends in the one or more data objects 600 regarding use of the computing devices or software of the computing resources 130, identifying a cyberattack on the computing resources 130, or may include other operations. The event log analytics subsystem 114 may perform the data analysis operations. In some implementations, a user of the computing resources 130 may view the results of the data analysis. The end user may use a user interface of the computing resources 130 that is in data communication with the event log analytics subsystem 114 to view the results.

In some implementations, the one or more first event logs 400 may be generated by one or more nodes of a cloud-based system at a first point in time. The one or more nodes of the cloud system may include one or more components 132, 134, 136 of the computing resources 130. The one or more second event logs 400 may be generated by the one or more nodes of the cloud-based system at a second point in time. In one implementation, execution of the event log parser at block 340, 750, or 850 may result in the detection of an indication of malicious activity with respect to a node of the cloud-based system. In some implementations, the detection of the malicious activity may include the event log analytics subsystem 114 analyzing the data object 600 generated by the parser executing on one or more of the one or more second event logs 400 and detecting the malicious activity based on a data analysis of the data objects 600.

In certain implementations, the one or more second event logs 400 of block 340, 750, or 850 may include one or more test event logs 400. A test event log 400 may include an event log 400 that the event log analytics system 110 or a user of the system 110 has identified for use in testing parsers or parser extensions. Causing the event log parser to be executed on the second event log 400 (in block 340, 750, or 850) may include presenting, on a user interface, a preview parsing of the second event log 400. The preview parsing can include a visualization of mappings 432 from one or more event log keys 404 of the second event log 400 to the event log keys' 404 corresponding predefined fields 434 based on the portions of the parser code. The preview parsing may include a visualization of the values 406 that were mapped to the predefined fields 434. The visualization may allow a user to view the mappings 432 and the values 604 assigned to the predefined fields 434 to determine whether the parser has been configured correctly.

In some implementations, the parser may include functionality in addition to mapping event log keys 404 to predefined fields 434. For example, in one implementation, causing the event log parser to be executed on the second event log 400 (in block 340, 750, or 850) may include the parser normalizing the value 406 mapped to a predefined field 434. In certain implementations, the parser may convert a value 406 into a different data format. For example, the raw event log 400 may include a timestamp in the UNIX epoch timestamp format (e.g., 1588059648.129), and the predefined format may include a timestamp in the format [YEAR]-[MONTH]-[DAY]T[HOUR]:[MINUTE]:[SECOND]Z (e.g., 2020-04-28T07:40:48.129Z) where T indicates that the data following the "T" is the clock time and Z indicates that the timestamp is offset from Coordinated Universal Time (UTC) by 0. In another example, the parser may convert a float to an integer. In certain implementations, the parser may automatically include certain data in the predefined format. For example, the parser may include one or more predefined fields 434 indicating the event type of the event log 400, the device that generated the event log 400 (e.g., the device's product name, the device's model identifier, the device's manufacturer or vendor, etc.), the software that generated the event log 400 (e.g., the software's name, the software's version, the software's developer or vendor, etc.), or other predefined fields.

In some implementations, the first event log 400 may include an event type. The event type may indicate information about the nature of the event represented by the event log 400. The event type may be indicated in the event log 400 itself or may be indicated by metadata associated with the event log 400. For example, in FIG. 6, the event type may be indicated by the predefined field-value pair 602-8, where the predefined field 434-8 is "metadata.event_type" and the corresponding value 604-8 is "NETWORK_HTTP." This may indicate that the event type of the event log 400 of FIG. 4A relates to Hypertext Transfer Protocol (HTTP) networking. As can also be seen from FIG. 4A, the event log 400 did not include a key 404 that indicated the event type. Thus, the parsing subsystem 112 may have determined the event type from metadata associated with the event log 400. The method 300, 700, or 800 may further include associating the event log parser with the event type. Associating the event log parser with the event type may include generating a logical link on the event log analytics system 110 between the parser and the event type. In one implementation, causing the event log parser to be executed on the second event log 400 (in block 340, 750, or 850) may include causing the event log parser to be executed in response to the second event log 400 belonging to the event type associated with the event log parser. The parsing subsystem 112, prior to or as part of causing the event log parser to be executed, may determine the event type. Determining the event type may be based on metadata associated with the second event log 400 or may include analyzing an event log key-value pair 402 of the second event log 400.

While FIG. 4A depicts an event log 400 with nine keys 404, an event log 400 may have any number of keys 404. Similarly, while the set 430 of mappings 432 in FIG. 4B includes seven mappings 432, a set 430 of mappings 432 may include any number of mappings 432. While the data object 600 of FIG. 6 includes ten predefined fields 434, a data object 600 may include any number of predefined fields 434.

Figure 10:
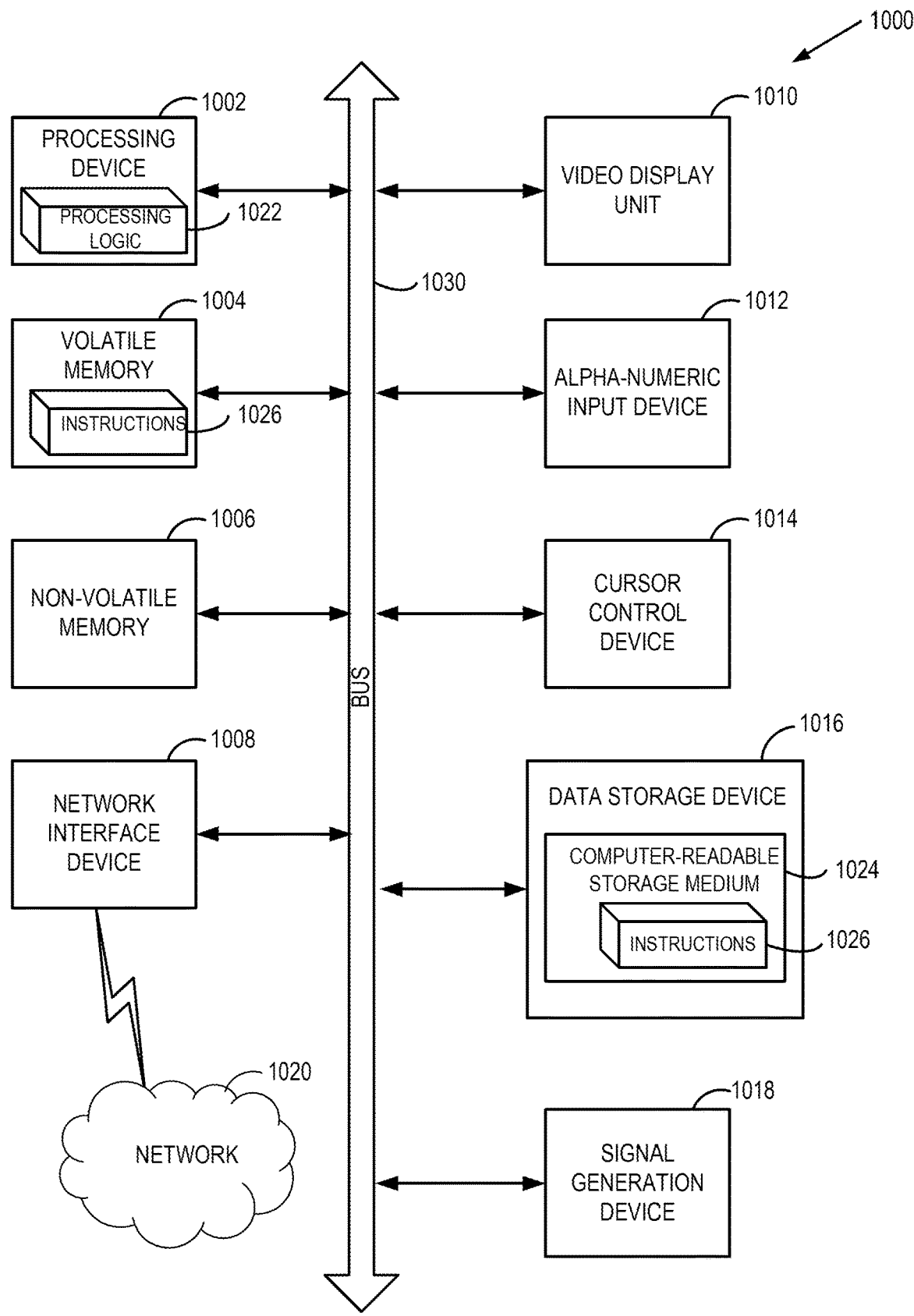
FIG. 10 depicts a block diagram of an example computer device capable of AI-based automated parser creation, in accordance with some implementations of the present disclosure.

FIG. 10 is a block diagram illustrating an example computer system 1000, in accordance with implementations of the present disclosure. The computer system can be a computing device or other device discussed herein. The computer system 1000 can be the event log analytics system 110, the parsing subsystem 112, the event log analytics subsystem 114, the parser storage 120, the event log storage 122, the AI subsystem 124, a server 132, a network device 134, or a data storage device 136 of FIG. 1. The computer system 1000 can be a cloud management system 212 of FIG. 2B. The computer system 1000 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a volatile memory 1004 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 1006 (e.g., flash memory, static random access memory (SRAM), etc.), and a data storage device 1016, which communicate with each other via a bus 1030.

The processing device 1002 represents one or more general-purpose processing devices such as a microprocessor, CPU, GPU, or the like. More particularly, the processing device 1002 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 can also be one or more special-purpose processing devices such as an ASIC, a field programmable gate array (FPGA), a digital signal processor (DSP), network processor, or the like. The processing device 1002 is configured to execute instructions 1026 (e.g., for performing one or more of the methods 300, 700, or 800) for performing the operations discussed herein.

The computer system 1000 can further include a network interface device 1008. The network interface device 1008 can assist in data communication between computing devices. The computer system 1000 also can include a video display unit 1010 (e.g., a liquid crystal display (LCD) or a cathode ray tube (CRT)), an input device 1012 (e.g., a keyboard, and alphanumeric keyboard, a motion sensing input device, touch screen), a cursor control device 1014 (e.g., a mouse), and a signal generation device 1018 (e.g., a speaker).

The data storage device 1016 can include a non-transitory machine-readable storage medium 1024 (also computer-readable storage medium) on which is stored one or more sets of instructions 1026 (e.g., for AI-based automated parser creation and other functionality disclosed herein) embodying any one or more of the methodologies or functions described herein. The instructions 1026 can also reside, completely or at least partially, within the volatile memory 1004 and/or within the processing device 1002 during execution thereof by the computer system 1000, the volatile memory 1004 and the processing device 1002 also constituting machine-readable storage media. The instructions 1026 can further be transmitted or received over a network 1020 via the network interface device 1008.

In one implementation, the instructions 1026 include instructions for AI-based automated parser creation or execution. While the computer-readable storage medium 1024 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods 300, 700, and 800 are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   obtaining a first event log of a first plurality of event logs of first telemetry data, wherein the first event log comprises a plurality of event log key-value pairs;
   generating, using a first artificial intelligence (AI) model, a portion of parser code that converts the first event log to a predefined format by mapping a first event log key of a first event log key-value pair of the plurality of event log key-value pairs to a predefined field;
   generating an event log parser that comprises the portion of the parser code; and
   causing the event log parser to be executed on a second event log of a second plurality of event logs of second telemetry data.

2. The method of claim 1, wherein:
the second event log comprises a second event log key and a corresponding value, wherein the second event log key corresponds to the first event log key; and
causing the event log parser to be executed on the second event log comprises the event log parser generating a data object that includes the predefined field and the value.

3. The method of claim 1, wherein the first AI model comprises at least one of:
a large language model (LLM); or
a natural language processing (NLP)-based AI model.

4. The method of claim 1, wherein the portion of parser code comprises source code configured to be compiled into computer-readable instructions.

5. The method of claim 1, wherein the first AI model comprises an AI model trained on first training data comprising a first plurality of portions of parser code.

6. The method of claim 5, wherein the first training data further comprises a plurality of sample event logs corresponding to the first plurality of portions of parser code.

7. The method of claim 6, wherein the first training data further comprises a plurality of predefined event types for the plurality of sample event logs.

8. The method of claim 5, wherein:
the first plurality of portions of parser code correspond to a first time; and
the method further includes replacing the first AI model with a second AI model, wherein the second AI model comprises an AI model trained on second training data comprising a second plurality of portions of parser code that correspond to a second time, and wherein the second time occurs after the first time.

9. The method of claim 1, wherein the first AI model comprises an AI model trained on training data comprising a schema that includes a plurality of predefined fields.

10. A system comprising:
a memory; and
at least one processing device, coupled to the memory, configured to perform operations, comprising:
obtaining a first event log of a first plurality of event logs of first telemetry data, wherein the first event log comprises a plurality of event log key-value pairs;
identifying, from among a plurality of predefined fields and by using a clustering-based artificial intelligence (AI) model, a predefined field for an event log key of a first event log key-value pair of the plurality of event log key-value pairs;
generating a portion of parser code that converts the first event log to a predefined format by mapping the event log key to the identified predefined field;
generating an event log parser that comprises the portion of the parser code; and
causing the event log parser to be executed on a second event log of a second plurality of event logs of second telemetry data.

11. The system of claim 10, wherein identifying the predefined field for the event log key comprises calculating a text string distance comparison metric between the event log key and the identified predefined field.

12. The system of claim 10, wherein identifying the predefined field for the event log key comprises using a k-means clustering calculation.

13. The system of claim 10, wherein identifying the predefined field for the event log key comprises using a fuzzy clustering calculation.

14. The system of claim 10, wherein identifying the predefined field for the event log key comprises using a clustering calculation based on a corresponding value for event log key.

15. A non-transitory computer-readable storage medium comprising instructions for a computing device that, when executed by a processing device, cause the processing device to perform operations comprising:
obtaining a first event log of a first plurality of event logs of first telemetry data, wherein the first event log comprises a plurality of event log key-value pairs;
identifying, from among a plurality of predefined fields and by using an artificial intelligence (AI) model, a first predefined field for an event log key of a first event log key-value pair of the plurality of event log key-value pairs;
generating a portion of parser code that converts the first event log to a predefined format by mapping the event log key to the identified first predefined field;
generating an event log parser that comprises the portion of the parser code; and
causing the event log parser to be executed on a second event log of a second plurality of event logs of second telemetry data.

16. The computer-readable storage medium of claim 15, wherein the AI model comprises an AI model trained on training data comprising a plurality of portions of parser code.

17. The computer-readable storage medium of claim 15, wherein identifying the first predefined field for the event log key comprises calculating a text string distance comparison metric between the event log key and the identified first predefined field.

18. The computer-readable storage medium of claim 15, wherein identifying the first predefined field for the event log key comprises:
for each predefined field in the plurality of predefined fields, calculating, using the AI model, a score for the predefined field;
presenting, on a user interface, the plurality of predefined fields, wherein a displayed order of the plurality of predefined fields is based on their respective calculated scores; and
obtaining an input, from the user interface, indicating the first predefined field.

19. The computer-readable storage medium of claim 18, wherein obtaining the input indicating the first predefined field comprises obtaining text data input into the user interface.

20. The computer-readable storage medium of claim 18, the operations further comprising updating the AI model based on the first predefined field.

* * * * *